(12) United States Patent
Shaffer

(10) Patent No.: US 10,859,183 B2
(45) Date of Patent: Dec. 8, 2020

(54) ANTI-ENTANGLEMENT KNOB FOR A SELF-CONTAINED BREATHING APPARATUS AIR CYLINDER VALVE

(71) Applicant: Chad Joseph Shaffer, Santa Maria, CA (US)

(72) Inventor: Chad Joseph Shaffer, Santa Maria, CA (US)

(*) Notice: Subject to any disclaimer, the term of this patent is extended or adjusted under 35 U.S.C. 154(b) by 29 days.

(21) Appl. No.: 16/252,329

(22) Filed: Jan. 18, 2019

(65) Prior Publication Data
US 2019/0219190 A1 Jul. 18, 2019

Related U.S. Application Data

(60) Provisional application No. 62/618,758, filed on Jan. 18, 2018.

(51) Int. Cl.
| | |
|---|---|
| *F16K 31/60* | (2006.01) |
| *F16K 35/04* | (2006.01) |
| *A62B 9/00* | (2006.01) |
| *A62B 7/02* | (2006.01) |

(52) U.S. Cl.
CPC .............. *F16K 31/607* (2013.01); *A62B 9/00* (2013.01); *F16K 35/04* (2013.01); *A62B 7/02* (2013.01)

(58) Field of Classification Search
CPC ........ F16K 31/607; F16K 35/04; F16K 35/00; F16K 27/12; A62B 9/00; A62B 7/02; E03B 9/06; F17C 2205/0308; A47K 3/005; A61M 16/06; A61M 16/20; A61M 16/201

USPC ............ 137/383, 395, 396, 377, 382, 382.5; 128/200.24, 201.21, 201.27, 201.23, 128/201.22, 201.28

See application file for complete search history.

(56) References Cited

U.S. PATENT DOCUMENTS

| | | | | |
|---|---|---|---|---|
| 2,703,572 | A * | 3/1955 | Seeler .................. | A62B 9/02 128/201.28 |
| 3,747,140 | A * | 7/1973 | Roberts ............... | B63C 11/2245 405/186 |
| 5,238,141 | A * | 8/1993 | Callegari .............. | F17C 13/002 137/382 |
| 5,259,374 | A * | 11/1993 | Miller ................... | A62B 9/02 128/200.24 |
| 5,309,945 | A * | 5/1994 | Sakai .................... | F16K 1/305 137/861 |
| 5,429,125 | A * | 7/1995 | Wagner ................ | A62B 7/02 128/204.18 |
| 5,970,977 | A * | 10/1999 | Sattelberg ........... | A62B 9/025 128/204.26 |

(Continued)

*Primary Examiner* — Justin M Jonaitis

(57) ABSTRACT

The present invention is an anti-entanglement knob for a self-contained breathing apparatus (SCBA) air cylinder valve, in which broadly comprises of an end terminating into a tapered shape on the side opposite from the SCBA air cylinder valve, and a guide/guard desirably located to guide objects to the tapered shape end, while also guarding undesired objects from entering between one or multiple components of the present invention and SCBA components. The present invention prevents entanglement by eliminating catching points and open areas that undesired objects, most commonly wires would usually be able to contact; furthermore objects are guided over and away from the present invention and the area of the SCBA that it is applied too.

11 Claims, 5 Drawing Sheets

(56) References Cited

U.S. PATENT DOCUMENTS

| | | | | |
|---|---|---|---|---|
| 5,996,578 | A | * | 12/1999 | MacGregor .............. A62B 9/00 128/201.27 |
| D439,956 | S | * | 4/2001 | Nilsson .................... A62B 9/00 D23/206 |
| 8,418,689 | B1 | * | 4/2013 | Davenport .......... B01F 3/04248 128/200.29 |

* cited by examiner

ANTI-ENTANGLEMENT KNOB FOR A SELF-CONTAINED BREATHING APPARATUS AIR CYLINDER VALVE

CROSS-REFERENCE TO RELATED APPLICATIONS

This application is based on and claims the benefit of priority of U.S. Provisional Patent Application No. 62/618,758, filed on Jan. 18, 2018.

FIELD OF INVENTION

The invention relates generally to a self-contained breathing apparatus (SCBA); more particularly to the SCBA air cylinder valve knob. The present invention is an Anti-entanglement air cylinder valve knob for an SCBA.

BACKGROUND OF THE INVENTION

A self-contained breathing apparatus (SCBA) provides a stored supply of compressed breathable air to the SCBA user. The breathable air stored in the SCBA air cylinder, allows for the SCBA user to survive in environments with atmospheric conditions that would otherwise compromise human life, and the process of oxygen exchange during human respiratory function. Common SCBA components broadly comprise of a backpack/frame, harness/traps, fasteners, buckles, air cylinder, air cylinder securing strap, air cylinder valve, air cylinder valve knob, regulators, hoses, gauges, electronics and a face piece. Firefighters are one of the more common users of an SCBA. Firefighters typically wear SCBA's on their back when entering an atmosphere that is immediately dangerous to life or health (IDLH).

The self-contained breathing apparatus (SCBA) air cylinder valve knob area is a common area for objects most commonly wires to become caught on, behind and/or entangled around; furthermore, this area creates a dangerous threat for wire entanglement with the SCBA user. Throughout history the fire service has concluded that a percentage of firefighter line of duty fatalities have been caused by SCBA entanglement.

Not only does the SCBA air cylinder valve knob create an entangling/catching point, it is also located in the SCBA user's lower back and buttocks region, which cannot be seen by the SCBA user while wearing the SCBA in the typical manner it is designed to be worn.

Currently there are no solutions for self-contained breathing apparatus (SCBA) cylinder valve knob entanglement, other than the user trying to untangle, cut or unhook the object(s) by hand; furthermore, these solutions are not always successful. The SCBA user may be in a confined space that does not allow for proper movement to detangle, unhook, or cut objects away from the SCBA air cylinder valve knob by hand. Visibility may be limited or completely absent due to conditions the SCBA user is in; therefore directly affecting the SCBA user's ability to see cutting tools and/or objects entangled or caught around the SCBA air cylinder valve knob and surrounding area. The emotional state and ability to remain calm and think clearly is a challenge for SCBA users when the SCBA becomes entangled and/or caught on objects; panic may occur and diminish the user's ability to methodically go through multiple steps to free the SCBA. These solutions rely on the user to free the SCBA with no help from the design of the SCBA itself. The International Association of Fire Fighters (IAFF) promote a training course entitled "Fire Ground Survival" (FGS); the FGS course teaches techniques to prevent SCBA entanglement with objects and what to do if an object becomes entangled with the SCBA, but these solutions are similarly unable to meet the needs of the industry because they rely solely on the SCBA user to methodically untangle, unhook and/or cut objects by hand, in poor and/or uncomfortable conditions, under extreme stress with high possibility for human error.

It would be desirable to have a self-contained breathing apparatus (SCBA) air cylinder valve knob that does not allow for objects, most commonly wires to become entangled around, caught on and/or behind the air cylinder valve knob itself. Therefore there currently exists a need in the industry for an SCBA air cylinder valve knob that guides objects to move over, off and/or around the knob itself, as well as guarding objects from entering between the SCBA air cylinder valve and knob; furthermore, accomplishing these needs by the simple directional body movements of the SCBA user is highly desirable.

SUMMARY OF THE INVENTION

Disclosed is an anti-entanglement knob for a self-contained breathing apparatus (SCBA) air cylinder valve, broadly comprising of: an end that tapers in size from larger to smaller; and a guide/guard. The tapered shape may resemble but will not be limited to a cone, stepped, pyramid, or a spherical shape; furthermore the tapered shape enables objects to move over the tapered end. The guide/guard functions to guide objects to at least one tapered side of the present invention and/or at least one component, while guarding objects from entering into structural voids between the present invention components and the SCBA air cylinder valve and/or SCBA components. The guide/guard may be formed by a structural surface and/or area of any present invention component and/or be a present invention component that functions with other components of the present invention; furthermore the guide/guard may be designed into an SCBA component. The guide/guard component may contact any present invention components at one end and any SCBA component(s) at the other end. The one or multiples of any guide/guard component, any present invention component, and/or any SCBA component may have clearance between one another. These components are related and/or connected as follows; the present invention attaches to at least one SCBA air cylinder valve opening and closing mechanism and functions to open or close the valve, as well as guiding objects to move off and away from the present invention itself. The tapered shape end may be of multiple components and/or may extend towards the SCBA air cylinder valve and/or air cylinder; in which it forms a guide/guard that guards objects from entering between the guide/guard terminating point and the SCBA component(s) it terminates adjacent too; furthermore it forms a guide between the guard section and tapered section. A guide/guard not formed by the extending tapered surface may be used; furthermore this guide/guard component would function with present invention components at one end and may contact and or attach to any SCBA component(s) at the other end; thus forming a guide/guard. The guide/guard component may be of multiple pieces and/or be positioned at any point of any present invention components surface in any amount including the full circumference or perimeter. SCBA directional movement and/or an objects movement over the SCBA enables the guide/guard and tapered end(s) to guide objects over and/or around the present invention, while guarding objects from entering structural voids between the present invention components and the SCBA air cylinder valve and/or SCBA components. The movement of objects along the guide/guard and/or tapered end can easily be accomplished by the SCBA user's simple directional body movement. FIG. 3 illustrates an objects path of travel over the SCBA while the user is crawling forward and or climbing; referring to FIG. 3, lined arrow (9) illustrates an objects direction of travel over the SCBA.

The present invention is functionally unique because it provides: An SCBA users to benefit from an SCBA air cylinder valve knob that prevents the SCBA from being entangled and/or caught on objects; Allows for simpler and quicker forward movement of an SCBA user in collapsed structures or compartments with low hanging wires; will dramatically help saves lives of SCBA users in environments that pose a threat for SCBA entanglement.

The present invention is structurally unique; More specifically, the present invention is unique due to the tapered shape end and a guide/guard that guides objects to move over and/or around the present invention and SCBA air cylinder valve, rather than catching on and/or between the present invention components and the SCBA air cylinder valve and/or SCBA components.

Among other things, it is an object of the present invention to provide a new SCBA air cylinder valve knob that does not suffer from any of the problems and/or deficiencies associated with prior inventions and solutions.

DETAILED DESCRIPTION OF THE INVENTION

The invention will now be described more fully hereinafter with reference to the accompanying drawings, which are intended to be read in conjunction with both this summary, the detailed description and any preferred and/or particular embodiments and variations specifically discussed or otherwise disclosed. This invention may, however, be embodied in many different forms and should not be construed as limited to the embodiments set forth herein; rather, these embodiments are provided by way of illustration only and so that this disclosure will be thorough, complete and fully conveys the full scope of the invention to those skilled in the art.

Figure 1:
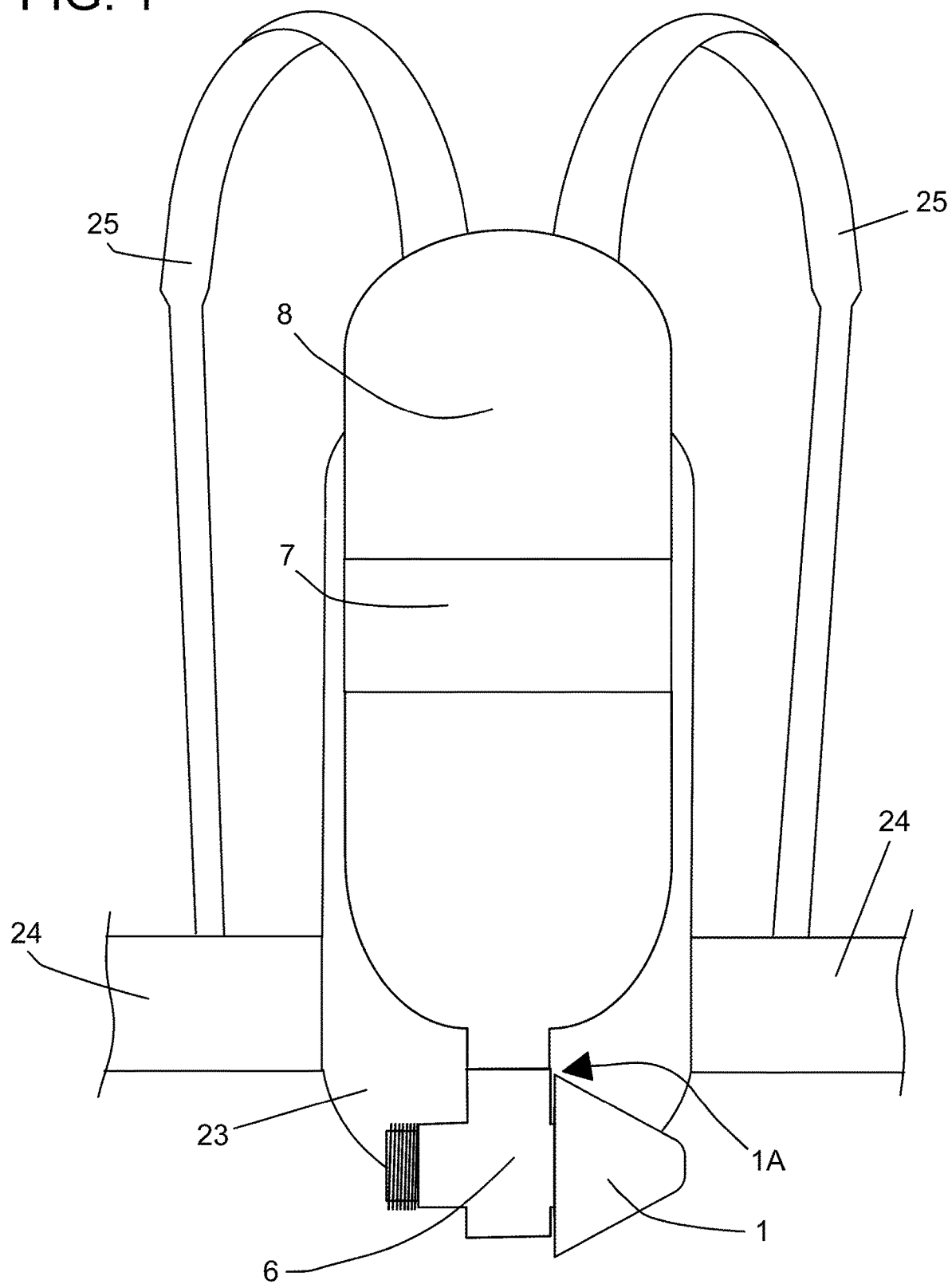
FIG. 1. Illustrates the present invention attached to an SCBA. The SCBA illustrated is minus the air hoses, fasteners, buckles, regulators, gauges, electronics, and a face piece. The view illustrated is the back side of the SCBA, opposite the side that contacts the user's back.
Figure 2:
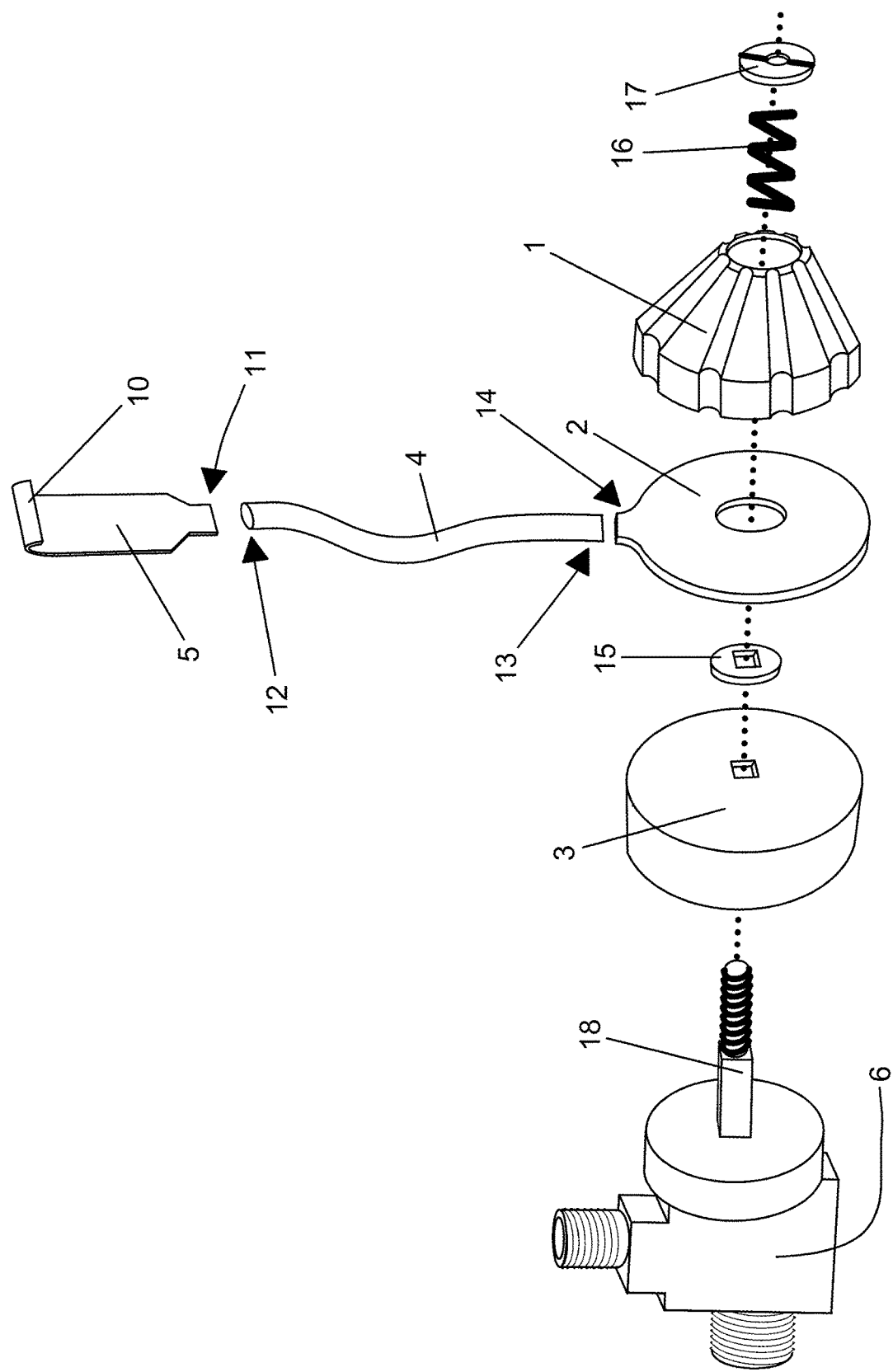
FIG. 2. Illustrates an SCBA air cylinder valve and exploded view of the present invention.

Referring to FIG. 1, the present invention is directed to a tapered anti-entanglement knob (1) for a self-contained breathing apparatus (SCBA) air cylinder valve (6). The typical SCBA includes the following components, a backpack/frame (23), waist straps (24), shoulder straps (25), air cylinder (8), air cylinder securing strap (7), air cylinder valve (6), fasteners, buckles, air hoses, regulators, gauges, electronics, and a face piece. The SCBA air cylinder (8) is an air tank and does not have to be cylindrical in shape; furthermore the SCBA air cylinder valve (6) is an SCBA air supply valve. The typical SCBA air cylinder valve (6) comprises a stem that is square in shape and terminates into a cylindrical threaded shape; FIG. 2 illustrates an SCBA air cylinder valve stem (18). Referring to FIG. 2, the clockwise and counter clockwise rotation of the air cylinder valve stem (18) functions to open and close the air cylinder valve (6). Typical SCBA air cylinder valve knob designs have an inner square opening that slides onto the square shape of the air cylinder valve stem (18) illustrated in FIG. 2; thus allowing for the typical SCBA air cylinder valve knob to slide onto the air cylinder valve stem (18), and rotate the air cylinder valve stem (18) when the typical SCBA air cylinder valve knob is rotated. The air cylinder valve stem (18), attached existing SCBA air cylinder valve knob, and/or any other SCBA components that open and close the SCBA air cylinder valve (6) are considered the SCBA air cylinder valve opening and closing mechanism. The typical SCBA air cylinder valve knob is secured to the air cylinder valve stem (18) with a fastener/securing nut spring (16) and fastener/securing nut (17) that are illustrated in FIG. 2; furthermore the fastener/securing nut spring (16) and fastener/securing nut (17) are recessed into the distal end of a typical SCBA air cylinder valve knob.

In its most complete version the present invention broadly comprises of: at least one end that tapers in size from larger to smaller and at least one guide/guard. Referring to FIG. 1, the tapered anti-entanglement knob (1) that extends to the air cylinder valve (6) in sufficient length and guards undesirable objects from entering between the tapered anti-entanglement knob (1) and the SCBA air cylinder valve (6) and/or air cylinder (8); furthermore this section of the tapered anti-entanglement knob is the guide/guard, and is identified by lined arrow (1A) in FIG. 1. The tapered anti-entanglement knob (1) may be designed with a hollow cavity on the SCBA air cylinder valve (6) side; furthermore this hollow cavity allows the tapered anti-entanglement knob (1) to have sufficient clearance over any SCBA air cylinder valve (6) body shape and/or existing knob, that would prohibit the guide/guard (1A) of the tapered anti-entanglement knob (1) from being flush or within sufficient proximity to the SCBA air cylinder valve (6) and/or air cylinder (8); in which the contact and/or sufficient clearance prohibits undesirable objects, most commonly wire of American wire gauge (AWG) size 40 and/or larger from entering between them; however the sufficient clearance may be zero inches or greater. Not every SCBA air cylinder valve (6) may allow for at least one present invention component to be flush or in sufficient proximity to the SCBA air cylinder valve (6) and/or SCBA components; in which the present invention may further comprise of at least one separate guide/guard component; furthermore, the guide/guard component functions to guide undesired objects to the tapered portion of the tapered anti-entanglement knob (1). The tapered anti-entanglement knob (1) will have a sufficient centered opening for the purpose of sliding onto and matching the shape of the SCBA air cylinder valve stem that the tapered anti-entanglement knob (1) is being installed on; however the tapered end may entirely or partially be free from the rotation of an SCBA air cylinder valve opening and closing mechanism. The side of the tapered anti-entanglement knob (1) opposite from the SCBA air cylinder valve (6) is the distal end and has a centered opening that recesses the fastener/securing nut spring and fastener/securing nut; furthermore this centered opening terminates and reduces into the centered opening for the SCBA air cylinder valve stem. The present invention components will not be limited to the typical SCBA air cylinder valve knob fastener and attachment design; furthermore, the present invention may be designed to attach to an existing SCBA air cylinder valve knob that is installed on an SCBA, which may resemble but will not be limited to an SCBA air cylinder valve knob cover. The tapered anti-entanglement knob (1) and/or one or multiple present invention components may be remotely located, and comprise of one or multiple components that functionally connects to one or multiple SCBA air cylinder valve opening and closing mechanisms; furthermore, this would allow for the tapered anti-entanglement knob (1) to be located in desirable remote locations other than directly on the SCBA air cylinder valve (6) and/or area. A functionally connecting component of the present invention attaches to and rotates with any of the SCBA air cylinder valve opening and closing mechanisms; furthermore, the functionally connecting component allows the tapered anti-entanglement knob (1) to rotate any SCBA air cylinder valve opening and closing mechanisms. The tapered shape of the tapered anti-entanglement knob (1) may be but not limited to straight, curved, and/or stepped; furthermore the tapered shape is a reduction in size from larger to smaller and terminates into an end; the tapered shape may be of any angle, so long as it reduces from larger to smaller. The distal end is the side of the present invention opposite and/or away from the SCBA air cylinder valve (6). The tapered anti-entanglement knob (1) may taper from larger to smaller on the SCBA air cylinder valve (6) side or opposite from the distal end.

Referring to FIG. 1, If the tapered anti-entanglement knob (1) component is unable to structurally create a guide/guard itself, and enables undesired objects to enter the space between the tapered anti-entanglement knob (1) and SCBA air cylinder valve (6) and/or SCBA air cylinder (8); then the present invention further comprises of a separate guide/guard component from the tapered anti-entanglement knob (1) itself. Referring to FIG. 2, the present invention comprising of a separate guide/guard component broadly comprises of the following components: a tapered anti-entanglement knob (1), lower guide/guard piece (2), middle guide/guard piece (4), upper guide/guide piece (5), bushing/spacer (15) and an inner knob piece (3). Referring to FIG. 2 These components are positioned, related and/or connected as follows; The following components slide onto the air cylinder valve knob stem (18) in the following order; first the inner knob piece (3), followed by the bushing/spacer (15) and the lower guide/guard piece (2), then the tapered anti-entanglement knob (1), fastener/securing nut spring (16) and fastener/securing nut (17). The fastener/securing nut (17) threads onto the threaded portion of the air cylinder valve stem (18) and prohibits the invention components from coming off of the air cylinder valve stem (18). The typical SCBA air cylinder valve stem (18) is square in shape and terminates into a cylindrical threaded shape; furthermore the clockwise and counter clockwise rotation of the air cylinder valve stem (18) functions to open and close the air cylinder valve (6). Typical SCBA air cylinder valve knob designs have an inner square opening that slides onto the square shape of the air cylinder valve stem (18), thus allowing for the typical SCBA air cylinder valve knob to rotate the air cylinder valve stem (18). The tapered anti entanglement knob (1), inner knob piece (3), and the bushing/spacer (15) all have a centered square opening that enables them to slide onto the square shaped section of the air cylinder valve stem (18). The lower guide/guard piece (2) does not have a square inner opening, instead the lower guide/guard piece (2) has an inner hole that fits the outside diameter of the bushing/spacer (15); thus allowing the lower guide/guard piece (2) to sleeve onto the bushing/spacer (15) and be free from the rotation of the air cylinder valve stem (18) and any components rotating with it. After the lower guide/guard piece (2) is sleeved onto the bushing/spacer (15) the surfaces of the lower guide/guard piece (2) and bushing/spacer (15) are even on both the tapered anti-entanglement knob (1) side and inner knob piece (3) side. The bushing/spacer (15) may be sufficiently thicker and not completely even to allow the lower guide/guard piece (2) to remain free from compression and/or friction when sandwiched between the inner knob piece (3) and the tapered anti-entanglement knob (1). The inner knob piece (3) may also have a bushing component to allow the inner knob piece (3) to be free from the rotation of the air cylinder valve stem (18) if desired. The tapered anti-entanglement knob (1) has a centered inner square opening on the lower guide/guard piece (2) side of the tapered anti-entanglement knob (1); thus enabling the tapered anti-entanglement knob (1) to slide onto and rotate the air cylinder valve stem (18) when the tapered anti-entanglement knob (1) is rotated. The tapered anti-entanglement knob (1) side opposite from the lower guide/guard piece (2) and/or distal end has a centered round opening slightly larger than the fastener/securing nut spring (16) and fastener/securing nut (17); furthermore, this round opening is deep enough for the fastener/securing nut spring (16) and fastener/securing nut (17) to be concealed inside the tapered anti-entanglement knob (1) when the fastener/securing nut (17) is tightened appropriately; this round opening terminates and reduces into the square shaped opening for the air cylinder valve stem (18). The present invention components will not be limited to the typical SCBA air cylinder valve knob fastener and attachment design; furthermore, the present invention may be designed to attach to an existing SCBA air cylinder valve knob that is installed on an SCBA, which may resemble but will not be limited to an SCBA air cylinder valve knob cover.

Referring to FIG. 2, the lower guide/guard piece (2), middle guide/guard piece (4), and upper guide/guard piece (5) are positioned, related and/or connected as follows; the lower guide/guard piece (2) and middle guide/guard piece (4) connect to each other at area of lined arrow (13) of the middle guide/guard piece (4) and area of lined arrow (14) of the lower guide/guard piece (2). The upper guide/guard piece (5) then connects to the middle guide/guard piece (4) at area of lined arrow (11) of the upper guide/guard piece (5) and area of lined arrow (12) of the middle guide/guard piece (4). The attachment of these components may be but not limited to welded, fused, glued and/or or crimped together to create a secure attaching connection. The connection of the lower guide/guard piece (2), middle guide/guard piece (4), and upper guide/guard piece (5) creates a guide/guard component.

Figure 3:
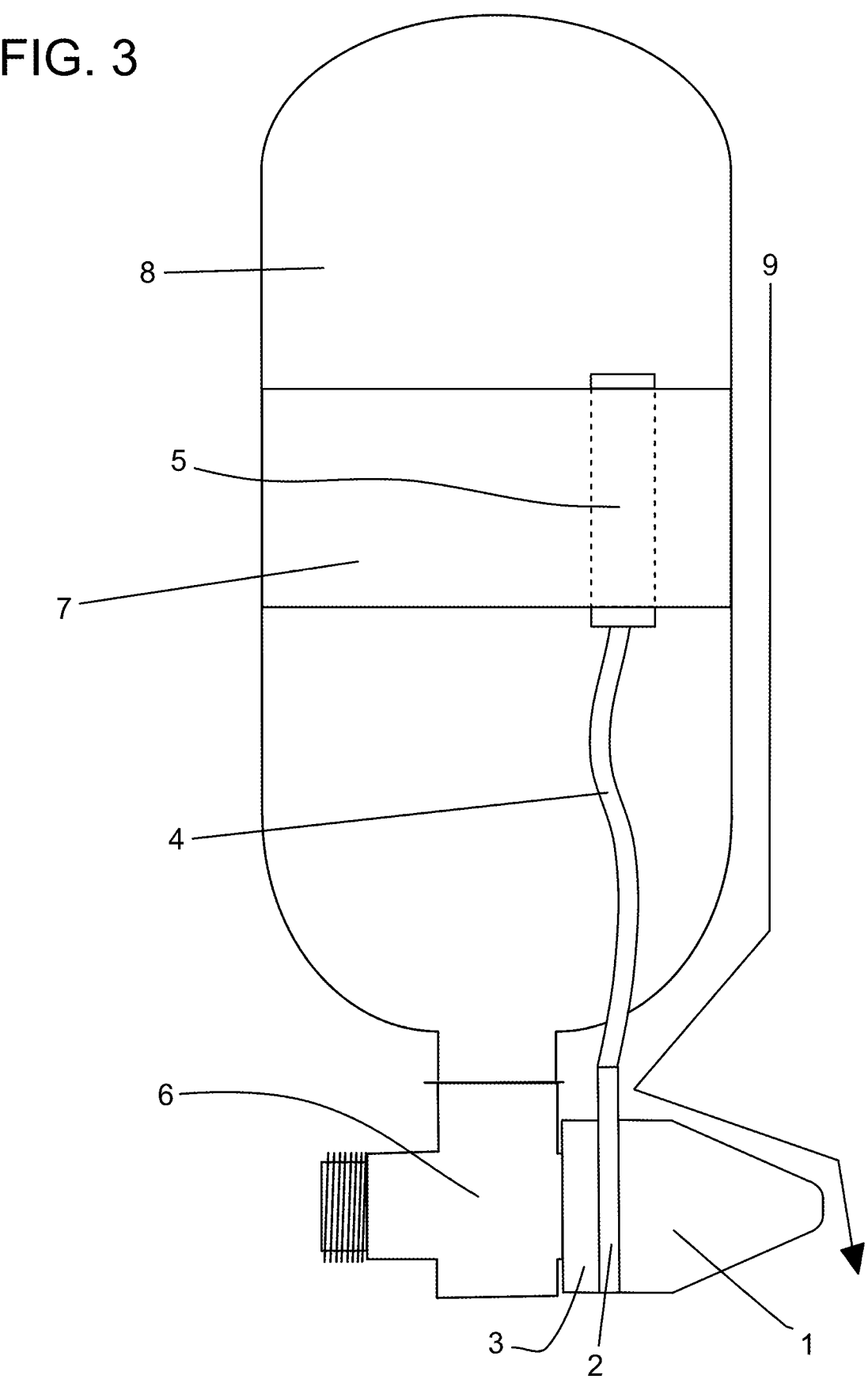
FIG. 3. Illustrates the present invention attached to an SCBA air cylinder valve, air cylinder, and air cylinder securing strap. The view illustrated is the side of the SCBA air cylinder and air cylinder valve that is opposite from the SCBA back/pack frame. The path of travel for objects moving over an SCBA air cylinder and present invention is also illustrated.

Referring to FIG. 2 and FIG. 3, the middle guide/guard piece (4) has flexible movement to allow the upper guide/guard piece (5) to be moved in and out from underneath an SCBA air cylinder securing strap, FIG. 3 illustrates the SCBA air cylinder securing strap (7). Referring to FIG. 2 and FIG. 3, the middle guide/guard piece (4) is of a round circular cable design that allows for sufficient flexible movement; furthermore the middle guide/guard piece (4) will not be limited to a flexible movement and may be but not limited to a folding, hinged, and/or telescoping movement, so long as it allows the SCBA user to move the upper guide/guard piece (5) in and out from under an SCBA air cylinder securing strap (7).

Referring to FIG. 2 and FIG. 3, the upper guide/guard piece (5) is flat and/or curved to fit the contour of an SCBA air cylinder. Illustrated in FIG. 2, the upper guide/guard piece (5) also has a hook (10) at the top portion to wrap over the SCBA air cylinder securing strap and prevent the upper guide/guard piece (5) from becoming dislodged from under the SCBA air cylinder securing strap when the strap is secured. FIG. 3 illustrates the upper guide/guard piece (5) between the SCBA air cylinder (8) and the air cylinder securing strap (7). Referring to FIG. 2, the hook (10) of the upper guide/guard piece (5) is not limited to a hook, and may be but not limited to a raised bump or step that prevents the upper guide/guard piece (5) from being removed from under an SCBA air cylinder securing strap when the strap is secured.

Referring to FIG. 2, the tapered anti entanglement knob (1), inner knob piece (3) and bushing/spacer (15) are illustrated as separate components, however the bushing/spacer (15) may be designed into the inner knob piece (3) itself or the tapered anti entanglement knob (1) itself; furthermore this would create an all in one inner knob piece (3) comprising a bushing/spacer (15) or an all in one tapered anti entanglement knob (1) comprising a bushing/spacer (15).

Referring to FIG. 3, the movement of objects over an SCBA, most commonly wires is represented by lined arrow (9). During object movement and/or SCBA forward movement, the objects in contact with the middle guide/guard piece (4), lower guide/guard piece (2) and/or tapered anti entanglement knob (1) will move off and away from the SCBA air cylinder valve area, thus preventing an entanglement. Lined arrow (9) illustrates the off and away movement of objects from the tapered anti entanglement knob (1). If an SCBA air cylinder valve (6) body shape enables the tapered anti-entanglement knob (1) to be flush and/or within sufficient proximity to one or multiple desired areas of the SCBA air cylinder valve (6) and/or any SCBA components, the present invention may still comprise of one or multiple guide/guard components. The purpose of the guide/guard is to guide objects to the tapered section of the anti-entanglement knob (1) and guard undesired objects from entering between the SCBA air cylinder valve (6) and present invention components; furthermore it should be understood that the word "guarding" has the same meaning as prohibiting. The section of the tapered anti-entanglement knob (1) opposite from the tapered distal end may function as a guide/guard if the section guards undesired objects from entering between present invention components and the SCBA air cylinder valve (6) and/or SCBA components.

Figure 4:
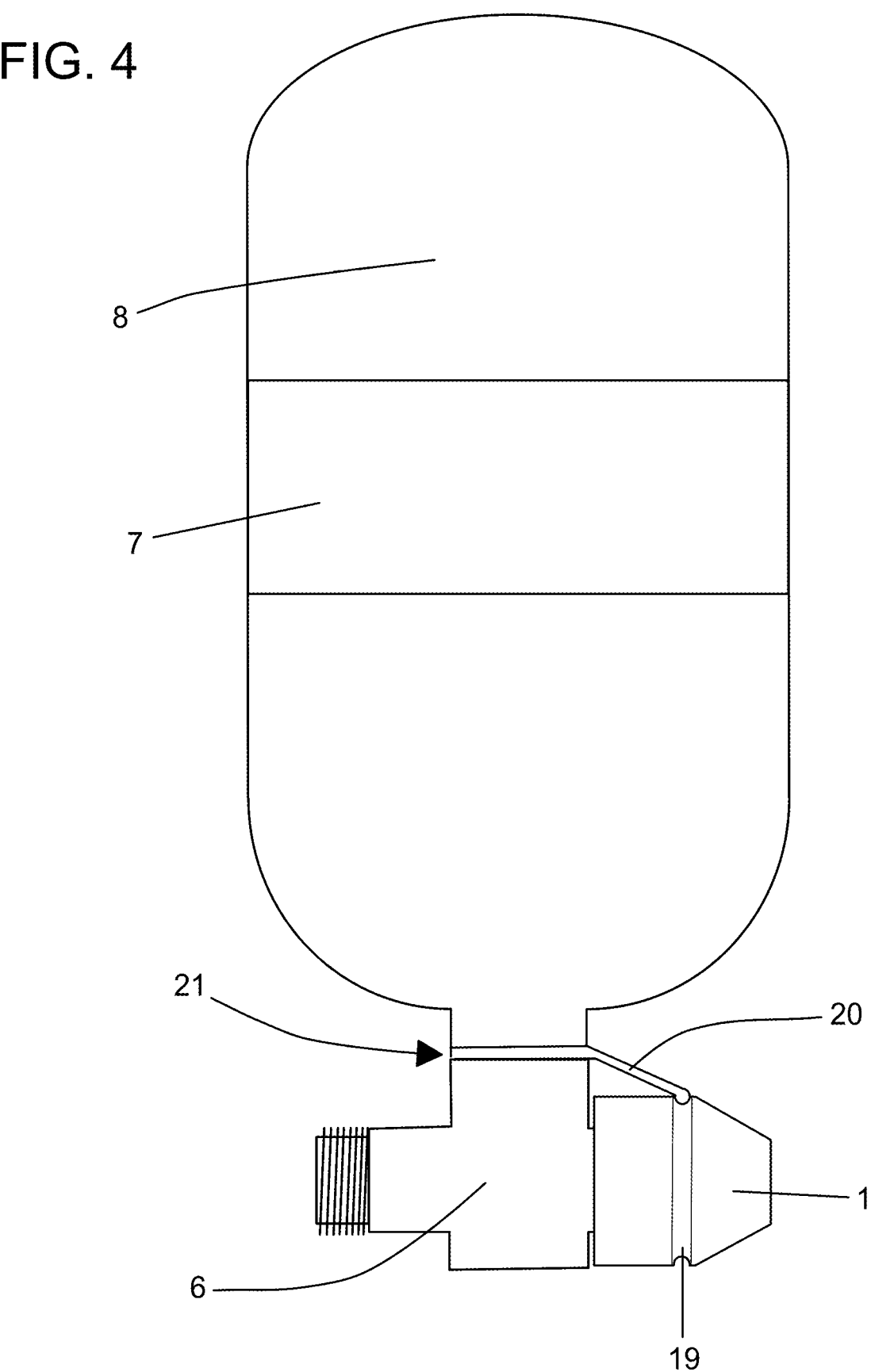
FIG. 4 Illustrates a variation of the present invention attached to an SCBA air cylinder valve, and air cylinder. The view illustrated is the side of the SCBA air cylinder and air cylinder valve that is opposite from the SCBA back/pack frame.

FIG. 4 Illustrates one variation of components for a tapered anti entanglement air cylinder knob (1) that comprises a guide/guard component to direct objects to the tapered anti entanglement knob (1); furthermore FIG. 4 is to help those skilled in the art to understand one of many possible variations of the present invention and will not limit the said invention variations. Referring to FIG. 4, the tapered anti entanglement knob (1) has a guide/guard groove (19) and contacts a mounted guide/guard (20). The mounted guide/guard (20) is flat and has a ball shape at one end that contacts the guide/guard groove (19) and a donut shape at the opposite end that sandwiches between the SCBA air cylinder (8) and air cylinder valve (6). Typical SCBA air cylinder valves, like air cylinder valve (6) in FIG. 4, have male threads that thread into female threads of the SCBA air cylinder, like air cylinder (8) in FIG. 4; furthermore, this connection area is defined by lined arrow (21) and is sometimes referred to as the SCBA air cylinder neck. Referring to FIG. 4, the male threaded end of the air cylinder valve (6) fits through the donut shaped end of mounted guide/guard (20) like a bolt through a washer; furthermore this allows the mounted guide/guard (20) to be secured when the air cylinder valve (6) is fastened to the air cylinder (8).

Figure 5:
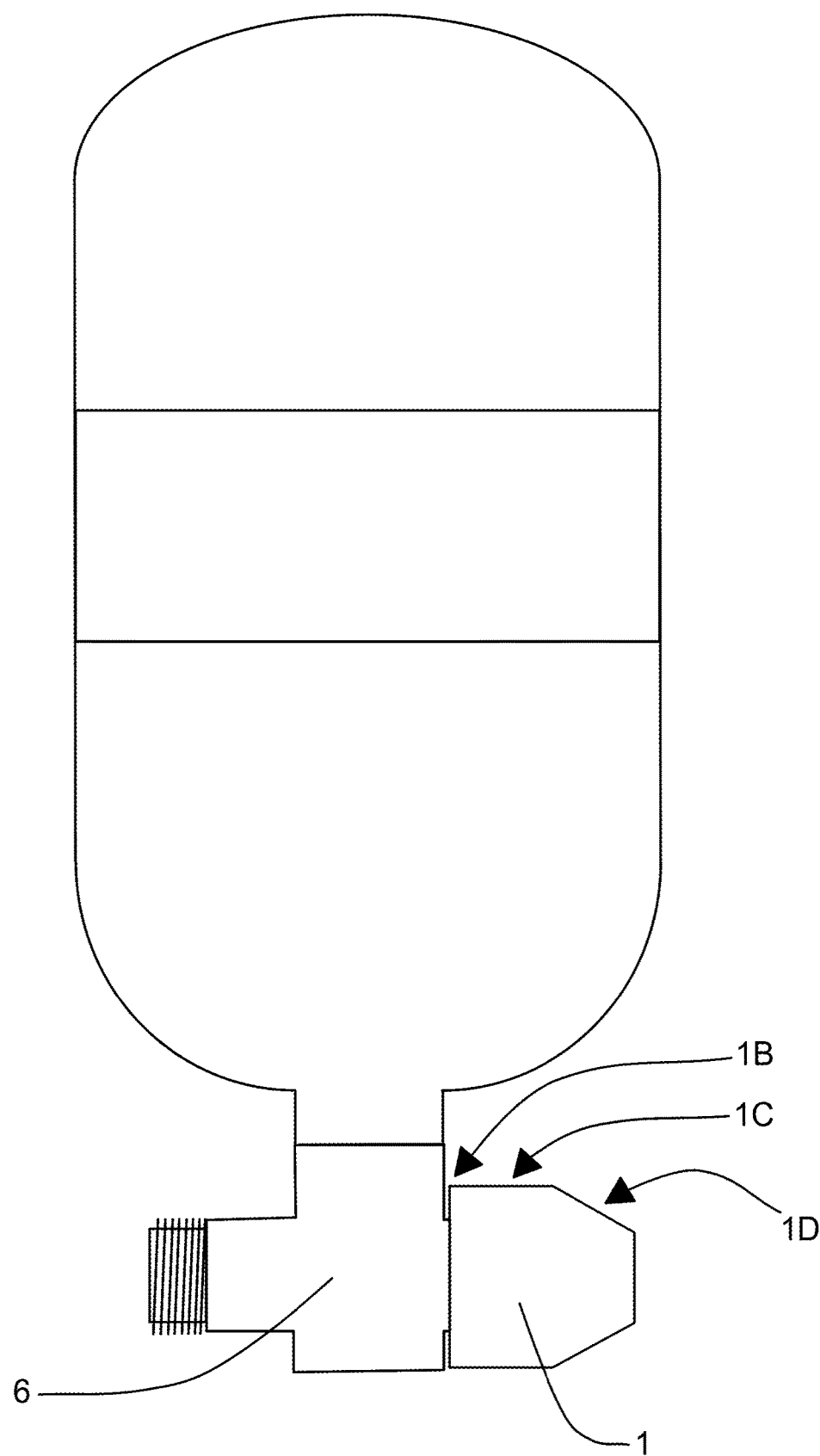
FIG. 5 Illustrates a variation of the present invention attached to an SCBA air cylinder valve, and air cylinder. The view illustrated is the side of the SCBA air cylinder and air cylinder valve that is opposite from the SCBA back/pack frame.

Referring to FIG. 5, the tapered anti-entanglement knob (1) comprises of an end that tapers in size and extends continuously towards the SCBA air cylinder valve (6) to structurally form a guide/guard. The tapered section of the end that tapers is identified by lined arrow (1D); the guide/guard is identified by lined arrows (1B) and (1C). The guide/guard section identified by lined arrow (1B) is the guard of the guide/guard; furthermore this section (1B) of the guide/guard, guard's undesired objects from entering between the anti-entanglement knob (1) and the SCBA air cylinder valve (6). The guide/guard section identified by lined arrow (1C) is the guide of the guide/guard and forms a guiding surface between the guard section (1B) of the guide/guard and the tapered section (1D) of the end that tapers. The guide/guard sections (1B) and (1C) are not limited to a minimum or maximum surface area size; furthermore the guide/guard sections (1B) and (1C) may be of the same location and or surface area. Referring to FIG. 1, the tapered anti-entanglement knob (1) with the guide/guard section identified by lined arrow (1A) is both the guide section and the guard section all in one, and forms the guide/guard. Furthermore, FIG. 5 is to help those skilled in the art to understand one of many possible variations of the present invention and will not limit the said invention variations.

It should also be understood that one or multiples of any guide/guard in any combination may be adjacent to, contacting and/or attached to one or more of the following: Any area(s) of any present invention component(s); any area of any SCBA component(s) and/or added component(s) to the SCBA that the present invention is be applied to. Guide/guard(s) do not have to directly contact other present invention components and/or SCBA components, so long as the clearance between the guide/guard and other present invention component(s) and/or SCBA component(s) is zero inches or greater; furthermore, this clearance range allows for any guide/guard to not have to be in contact with other present invention components, while guarding an undesired object's minimum size to enter between the guide/guard and present invention component(s) and/or SCBA component(s). The guide/guard is not limited and may guide and/or guard undesired objects across an entire surface area or only at a specific point. Any combination and variation of assembly and/or component combinations and variations may be used based on the SCBA design that the said invention is being applied too. It should also be known that the term "cylinder" is interchangeable with "tank"; thus an air cylinder also defines an air tank component, and does not have to be cylindrical in shape; furthermore, an SCBA air cylinder valve is an SCBA air supply valve.

As discussed, the present invention has many different features, variations and multiple different components and/or embodiments. The present invention has been described in this application at times in terms of specific components and/or embodiments for illustrative purposes and without the intent to limit or suggest that the present invention conceived is only one particular component and/or embodiment. It is to be understood that the present invention is not limited to any single specific component and/or embodiments or enumerated variations. Many modifications, variations, components and/or other embodiments of the present invention will come to mind of those skilled in the art to which this present invention pertains, and which are intended to be and are covered by both this disclosure. It is indeed intended that the scope of the present invention should be determined by proper interpretation and construction of the disclosure, including equivalents, as understood by those of skill in the art relying upon the complete disclosure at the time of filing.

I claim:

1. An anti-entanglement kit for an existing gas cylinder valve of an existing self-contained breathing apparatus (SCBA) comprising:
   a knob with a surface that tapers in size from a larger size to a smaller size, from a first longitudinal end to a second longitudinal end, said knob being functionally attached to an opening and closing component of the gas cylinder valve, said first end including an opening to engage the opening and closing component of the gas cylinder valve; and
   a guide/guard that fits into a space between the knob and the gas cylinder valve to fill said space, said guide/guard being connected to at least one existing component that is connected to the existing gas cylinder valve such that when an object contacts the self-contained breathing apparatus the object would travel over the Self-contained breathing apparatus, the guide/guard and slides off the surface of the knob to prevent entanglement.

2. The apparatus of claim 1 wherein the existing component is a neck of the gas cylinder valve where a tank connects, and the guide/guard forms an angled surface extending between the neck and the knob, wherein the angled surface and the tapered knob create a path for the object to move away from the tank and off the second end of the knob to prevent entanglement.

3. The apparatus of claim 1 wherein the existing component is a tank and the guide/guard connects to the tank via a securing strap, said guard forming an angled surface to create a path for the object to move away from the tank and off the second end of the knob to prevent entanglement.

4. An anti-entanglement gas cylinder valve for a self-contained breathing apparatus (SCBA) comprising:
   a gas cylinder valve comprising a main body and an air cylinder valve stem for opening and closing the air cylinder valve, and a connector to connect to a tank of the SCBA;
   a knob with a surface that tapers in size from a larger size to a smaller size, from a first longitudinal end to a second longitudinal end, said knob being functionally attached to the air cylinder valve stem, said first end including an opening to engage the air cylinder valve stem; and
   a guide/guard that fits into a space between the knob and the gas cylinder valve to fill said space, said guide/guard being connected to at least one component that is connected to the gas cylinder valve such that when an object contacts the self-contained breathing apparatus the object would travel over the Self-contained breathing apparatus, the guide/guard and the surface of the knob to prevent entanglement.

5. The apparatus of claim 4 wherein the component is a neck of the gas cylinder valve where a tank connects, and the guide/guard forms an angled surface extending between the neck and the knob, wherein the angled surface and the tapered knob create a path for the object to move away from the tank and off the second end of the knob to prevent entanglement.

6. The apparatus of claim 4 wherein the component is a tank and the guide/guard connects to the tank via a securing strap, said guide/guard forming an angled surface to create a path for the object to move away from the tank and off the second end of the knob to prevent entanglement.

7. An anti-entanglement gas cylinder valve for a self-contained breathing apparatus (SCBA) comprising:
   a gas cylinder valve comprising a main body and an air cylinder valve stem for opening and closing the air cylinder valve, and a connector to connect to a tank of the SCBA;
   an outer knob with a surface that tapers in size from a larger size to a smaller size, from a first longitudinal end to a second longitudinal end, said outer knob being functionally attached to the air cylinder valve stem, said first end including an opening to engage the air cylinder valve stem;
   an inner knob which is cylindrical in shape, said inner knob having an opening extending through the inner knob to allow the air cylinder valve stem to pass through the inner knob; and
   a guide/guard that fits into a space between the inner knob and the outer knob to fill said space, said guide/guard being connected to at least one component that is connected to the gas cylinder valve such that when an object contacts the self-contained breathing apparatus the object would travel over the Self-contained breathing apparatus, the guide/guard and the surface of the outer knob to prevent entanglement.

8. The apparatus of claim 7 wherein the component is a neck of the gas cylinder valve where a tank connects, and the guide/guard forms an angled surface extending between the neck and the knob, wherein the angled surface and the tapered knob create a path for the object to move away from the tank and off the second end of the outer knob to prevent entanglement.

9. The apparatus of claim 7 wherein the component is a tank and the guide/guard connects to the tank via a securing strap, said guide/guard forming an angled surface to create a path for the object to move away from the tank and off the second end of the outer knob to prevent entanglement.

10. The apparatus of claim 7 wherein the inner knob engages air cylinder valve stem in order to open and close the gas cylinder valve.

11. The apparatus of claim 7 wherein the inner knob does not function to open and close the gas cylinder valve; and
   the outer knob engages the air cylinder valve stem to open and close the gas cylinder valve.

* * * * *